Jan. 11, 1966  L. PÉRAS  3,228,499
SYNCHRO-MESH DEVICES FOR DOG-COUPLING
Filed Feb. 24, 1964  2 Sheets-Sheet 1

Inventor
Lucien Péras
By Stevens, Davis, Miller & Mosher
Attorneys

Jan. 11, 1966   L. PÉRAS   3,228,499
SYNCHRO-MESH DEVICES FOR DOG-COUPLING
Filed Feb. 24, 1964                                    2 Sheets-Sheet 2

Inventor
Lucien Péras
By Stevens, Davis, Miller + Mosher
Attorneys

United States Patent Office 3,228,499
Patented Jan. 11, 1966

3,228,499
SYNCHRO-MESH DEVICES FOR DOG-COUPLING
Lucien Péras, Billancourt, France, assignor to Regie Nationale des Usines Renault, Billancourt, France
Filed Feb. 24, 1964, Ser. No. 346,633
Claims priority, application France, Feb. 26, 1963,
926,113, Patent 1,357,748
2 Claims. (Cl. 192—53)

This invention relates to a synchroniser construction for dog coupling, of the so-called "preventer" type wherein the adequate relative position of the members preventing the dog engagement prior to the synchronisation is predetermined by taking advantage of the relative rotation produced between the members to be coupled.

It relates more particularly to a synchromesh device construction wherein the above-mentioned preventer and pre-set functions are obtained notably by means of a synchroniser ring interposed between the members to be coupled. A long useful life of these rings is considered as a primary requirement of synchronisers as currently used in gearboxes of vehicles.

It is the essential object of this invention, in a synchroniser of the type broadly set forth herein above which is designed primarily for ensuring a long useful life of the synchroniser ring, to provide such combined or relative arrangements of parts as to impart to the friction surfaces of said ring which are effective in the presetting, preventer and synchronising actions a particularly long useful life, said combined or relative arrangements of parts being such that notably the wear of said friction surfaces is confined to the step involving their setting into action, the corresponding construction being nevertheless particularly simple.

More particularly, this invention is concerned with a synchroniser comprising a gear formed with an inner set of dog teeth, a sliding sleeve formed with corresponding dog teeth, a hub on which said sleeve is so mounted as to revolve bodily therewith while being free to slide axially for engaging or disengaging said dog teeth for coupling or uncoupling said gear and hub in relation to each other, a synchroniser ring comprising a friction cone adapted to engage a corresponding cone formed on said sliding sleeve, said ring being axially movable with respect to the dog teeth of, and rotatably solid with, said gear due to the provision of a pair of inner lugs engaging with a certain angular lost motion axial notches formed in said gear, said ring being furthermore responsive to elastic return means constantly urging same to its inoperative position in which said lugs are in frictional bearing contact with said hub while said friction cones reman spaced from each other in the corresponding neutral position of said sliding sleeve, this invention being characterized essentially in that said synchroniser ring is formed with inner teeth of which the front faces registering with said gear are so shaped as to co-act with skew faces at the leading ends of the gear dog teeth in order to ensure the preventer function consisting in preventing the dog engagement before the synchronisation has been completed, and that said lugs have such an angular lost motion that, in their endmost positions of abutment against the side faces of said gear notches and in the inoperative position of said synchroniser ring, said front faces of the inner teeth of said synchroniser ring register with the skew faces of the dog teeth leading ends but are separated therefrom by a certain axial play.

A typical form of embodiment of a synchromesh device constructed according to the teachings of this invention is described hereinafter by way of example with reference to the accompanying drawings, in which.

Figure 1:
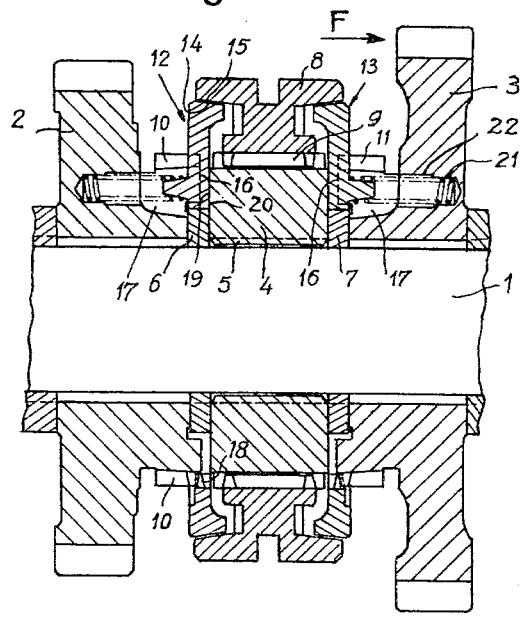
FIGURE 1 is an axial sectional view of a synchromesh device of the well-known twin type.

The synchromesh device illustrated in FIGURE 1 of the drawings constitutes a typical form of embodiment of this invention in the case of a twin-type synchroniser of conventional use in gearboxes.

This form of embodiment comprises on a common shaft 1 formed with outer splines a pair of loosely rotating gears 2, 3 and therebetween a hub 4 formed with inner splines 5 engaging those of shaft 1, this hub 4 being spaced from the gears by spacer thrust rings 6, 7. Thus hub 4 is further provided with outer splines engaged by inner splines 9 of a sliding sleexe 8, said inner splines 9 corresponding to the dog teeth 10, 11 formed on gears 2 and 3 respectively.

With respect to its neutral position shown in FIGURE 1 this sliding sleeve 8 is thus adapted to be moved into meshing engagement with either of the sets of dog teeth 10 or 11 in order to cause the corresponding gear 2 or 3 to revolve bodily with shaft 1, respectively.

In order to ensure a proper meshing engagement between the sliding sleeve 8 and either of gear dogs 10 or 11, there is provided between the sliding sleeve 8 and each gear a synchroniser ring consisting in this example of a pair of ring elements 12, 13 which have exactly the same shape and dimensions. Each ring element 12, 13 comprises a friction cone 14 adapted to engage a corresponding complementary cone 15 formed on the sliding sleeve.

Each ring is rotatably solid with the relevant gear through the medium of inner lugs 16 engaging axial notches 17 formed on the gear so as to permit an axial movement of the ring element on the dog teeth of the relevant gear. Said ring element is formed to this end with inner dogs 18 complementary to the dog teeth and adapted to mesh therewith under conditions to be set forth presently.

Furthermore, the ring element is responsive to an elastic return device adapted to urge same to its inoperative position in which, assuming that the sliding sleeve 8 is in its neutral position, the faces 19 of said lugs are in frictional bearing contact with the end face 20 of said hub, while the friction cones 14, 15 of said ring element and sliding sleeve remain spaced from each other (see FIGURE 1). This return action is obtained through means which are particularly simple, reliable and small-sized, in the form of helical springs 21 fitting in said notches 17 and bearing with one end against said lugs 16 formed to this end with centering studs or pins, and with the opposite end in guide holes 22 formed in the gear at the same radius as the notches.

Figure 2:
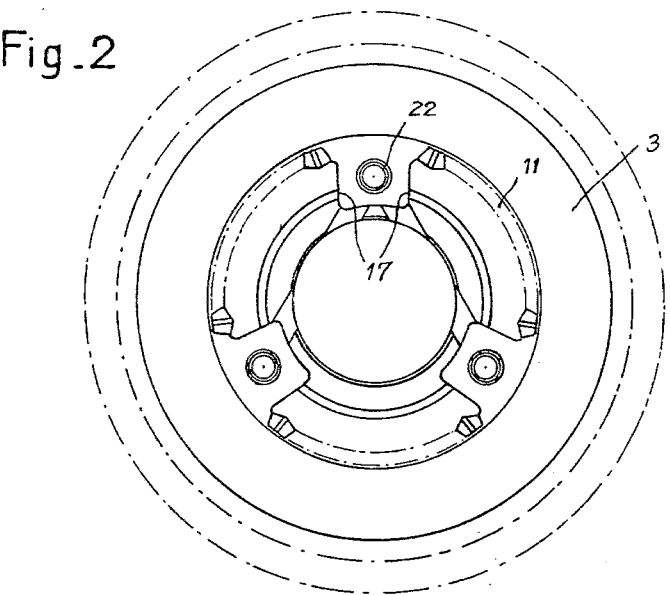
FIGURE 2 is an end view of one of the gears of FIGURE 1 as seen in the direction of the arrow F.
Figures 3, 4, 5:
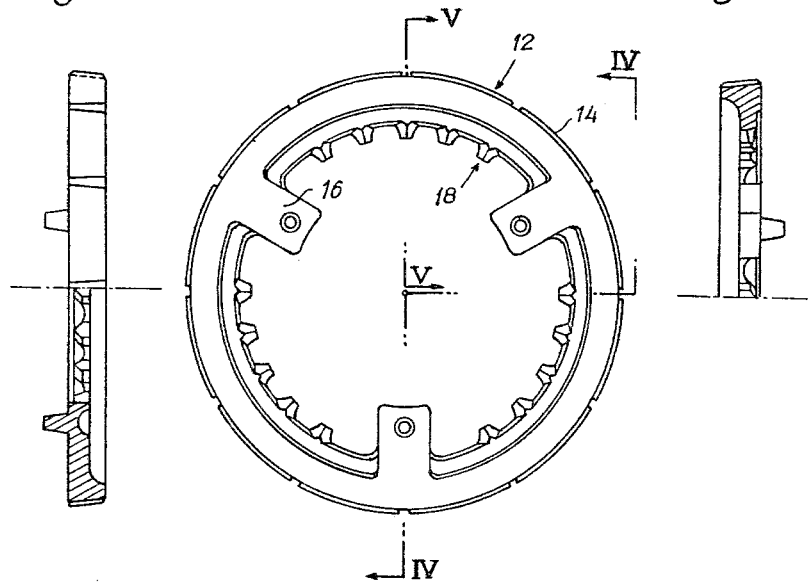
FIGURE 3 is a similar view of one of the synchroniser rings.
FIGURE 4 is a side elevational view of the structure shown in FIGURE 3, with a fragmentary section taken upon the line IV—IV.
FIGURE 5 is a fragmentary section taken upon the line V—V of FIGURE 3.
Figure 6:
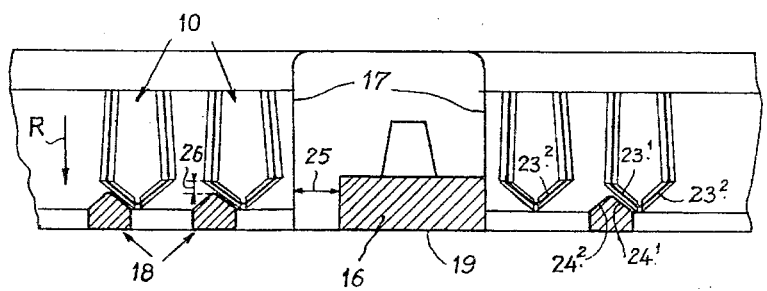
FIGURE 6 is a developed or unwrapped detail view showing the function of the synchroniser ring.

As in conventional arrangements and as shown notably in FIGURES 1, 2 and 6, each set of dog teeth 10, 11 is formed with skew leading faces registering with likewise skew-faced dog teeth 9 of said sliding sleeve. The skew leading faces of the dog teeth are thus formed with surfaces $23^1$, $23^2$ extending obliquely in relation to the gear axis, and other surfaces $24^1$, $24^2$ having the same inclination which are formed on the inner teeth 18 of said synchronizer ring correspond to said surfaces $23^1$, $23^2$, said inner teeth 18 being bevelled in front of said gear.

Moreover, the lugs 16 formed on the synchronizer ring have a certain degree of angular lost motion 25 (FIGURE 6) in the aforesaid notches 17, whereby in the positions of said lugs which correspond to their abutment against the side faces of notches 17, and while said synchronizer ring is in its inoperative position, the skew faces $24^1$ or $24^2$ of the ring dogs 18 register with the skew faces $23^1$ or $23^2$ of the corresponding dogs, but with a certain axial clearance 26 (FIGURE 6) therebetween.

This synchromesh device operates as follows:

When in the neutral position of the sliding sleeve 8 the velocity of rotation of the rotary assembly consisting of shaft 1, hub 4 and said sliding sleeve departs to a certain extent from the speed of the assembly consisting of gear 2 and the relevant gear 2 (taken by way of example in this case), the frictional contact occurring between the faces 19 of lugs 16 and the face 20 of hub 4 causes said lugs according to the direction of relative rotation of these two assemblies, are caused to abut against one or the other of the side faces of notches 17, whereby the skew faces $24^1$ or $24^2$ of the dog teeth 18 formed on the synchronizer ring are caused automatically to register with the faces $23^1$ or $23^2$ of dog teeth 10, but remain spaced therefrom as shown in FIGURE 6. This condition of operation corresponds to a continuous presetting of the synchronizer, prior to the synchronization proper which will be caused by any subsequent attempt to couple the sliding sleeve 8 with ring element 12.

In fact, the movement of the sliding sleeve toward the ring 12 will cause, after the axial stroke necessary for producing the driving engagement between the friction cones 14, 15 and the contact between the skew faces shown at 26 in FIGURE 6, the direct and reliable relative contact between the skew faces such as $23^1$ and $24^1$ of dogs 18 and 10, which faces in this step act as preventer means in that they prevent the dog engagement from taking place before the synchronization.

The relative engagement of the friction cones 14, 15 produces between the sliding sleeve and the gear a synchronizing torque attended by an axial reaction in the direction R opposite to the direction of the effort necessary for moving the sliding sleeve 8, as a result of the setting of skew faces $23^1$ and $24^1$ in relative contact. In this respect it may be noted that this reaction can in no way involve a backward movement of the synchronizer ring from its position obtaining at the end of the movement 26 of FIGURE 6, for this reaction is then cancelled by the bearing engagement of the ring lugs 16 against the side faces of notches 17, this bearing engagement serving the purpose of preventing any relative rotation between said ring and the relevant gear, which would be necessary for causing a backward movement of the ring. As a result, during the synchronization producing the necessary cooperation of oblique surfaces such as $23^1$, $24^1$ with the hitherto inoperative contours 14, 15, the lug faces 19 are no more in frictional contact with the hub 4 and are therefore definitely free from any wear in connection with the synchronizing step proper.

When the relative speed between said assemblies to be synchronized becomes zero, the synchronization is eliminated as well as the above-mentioned reaction in the direction R, and the dog-engagement preventer action is removed, whereby the effort necessary for moving the sliding sleeve, as a consequence of the relative sliding movement of skew faces $23^1$, $24^1$, will produce such a relative rotation of synchronizer ring 12 and dogs 10 that the teeth 18 of said ring can engage the teeth 10 in the axial direction and permit the meshing engagement between the teeth 9 of said sliding sleeve and said teeth 10 to produce the necessary coupling between the sliding sleeve and gear 12 and cause the synchronizer ring to resume its neutral or inoperative condition.

As the sliding sleeve resumes its neutral position, the lugs 16 resume their operative function by moving into frictional engagement against the hub of the sliding sleeve, thus causing one of the set of skew faces of teeth 18 on the synchronizer ring and of the dog teeth 10 to move in relative alignment as the friction cones are again moved away from each other.

Under these conditions it is clear that the various presetting, preventer and synchronizing functions are produced by synchronizer component elements which become really operative only for performing their specific functions and also that more particularly the preventer action is obtained by resorting to a relatively great number of wear-resistant surfaces such as the leading faces of the dog teeth, which are advantageously utilised in this case, and of the special teeth formed on the synchronizer ring, the construction of this synchronizer ring being nevertheless particularly simple and adapted to be carried out by moulding or sintering.

I claim:

1. A synchronous device comprising a rotatable shaft; at least one gear mounted on said shaft and having a plurality of axial notches and teeth provided with skew faces; a sleeve having corresponding teeth to those of said gear; means supporting said sleeve for rotational movements with said shaft as well as for axially slidable movements from an operative to an inoperative position to respectively engage and disengage said gear to respectively couple and uncouple same to said supporting means; a synchronizer ring mounted about said shaft for axial slidable movements between said sleeve and said gear, said ring having a plurality of inner lugs engaging said axial notches with a predetermined angular lost motion, one face of each of said lugs normally engaging said supporting means in the inoperative position of said sleeve; said lugs adapted to frictionally engage said sleeve upon axial movement of the latter into an operative position towards said gear; elastic return means urging said ring into an inoperative position in which said lugs engage said supporting means and in which said ring is disengaged from said sliding sleeve in the inoperative position of the latter, said synchronizer ring being formed with inner teeth, the front faces of which register and coact with said gear teeth to prevent engagement thereof before the synchronization has been completed, said angular lost motion being such that in said lugs' endmost positions of abutment against the side faces of said axial notches and in the inoperative position of said ring, said front faces of the inner teeth of said ring register with the skew faces of the gear teeth leading ends.

2. The device of claim 1, further comprising a guide hole formed in said gear and wherein said return means comprises a plurality of coil springs, each having one and bearing against one of said lugs and having its other end disposed in said guide hole.

References Cited by the Examiner
UNITED STATES PATENTS 2,150,468  3/1939  Thomson.
2,992,714  7/1961  Peras.
3,035,674  5/1962  Peras.

DAVID J. WILLIAMOWSKY, *Primary Examiner.*